United States Patent
Crivellaro et al.

[15] 3,696,195
[45] Oct. 3, 1972

[54] STABLE AQUEOUS STEROID PHOSPHATE SOLUTIONS

[72] Inventors: Giovanbattista Crivellaro; Bruno Crestani, both of Milan, Italy

[73] Assignee: Gruppo Lepetit S.P.A., Milan, Italy

[22] Filed: May 6, 1970

[21] Appl. No.: 35,236

[30] Foreign Application Priority Data

May 7, 1969 Italy....................16446-A/69

[52] U.S. Cl. ..............424/175, 260/397.45, 424/243
[51] Int. Cl. ...............................................A61k 9/00
[58] Field of Search ..........260/397.45; 424/175, 243

[56] References Cited

UNITED STATES PATENTS

| | | |
|---|---|---|
| 3,146,164 | 8/1964 | Macek et al. ..........424/175 X |
| 2,719,812 | 10/1955 | Hanus........................424/175 |
| 2,498,200 | 2/1950 | Bray..........................424/175 |

Primary Examiner—Shep K. Rose
Attorney—Griswold & Burdick, C. Kenneth Bjork and Maynard R. Johnson

[57] ABSTRACT

Pharmaceutical compositions suitable for parenteral administration, consisting of aqueous solutions of steroid 21-phosphate esters stabilized with a compound selected from thioglycerol and thioglycolic acid.

9 Claims, No Drawings

STABLE AQUEOUS STEROID PHOSPHATE SOLUTIONS

This invention relates to pharmaceutical compositions suitable for parenteral administration. More particularly, this invention is concerned with stable aqueous solutions of 21-hydroxysteroid 21-phosphate esters.

The 21-phosphates of 21-hydroxysteroids are commonly used for the preparation of aqueous solutions suitable for parenteral administration, since they are far more soluble than the corresponding 21-hydroxysteroids and their 21-ester with carboxylic acids. However, the 21-phosphate esters are readily hydrolized in water and from aqueous solutions the 21-hydroxysteroids generally precipitate after a very short time. It is therefore necessary to prepare the aqueous solution just before actual administration, or alternatively to add to the solution a stabilizing agent.

It has now been found that a particularly suitable and advantageous stabilizing agent for preparing stable aqueous solutions of 21-hydroxysteroid 21-phosphates is a compound selected from thioglycerol and thioglycolic acid of the formula

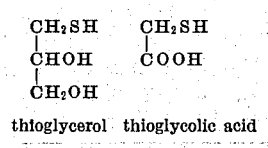

thioglycerol    thioglycolic acid

The pharmaceutical parenteral compositions to which the above stabilizing agents can be added with excellent results are parenteral solutions containing the 21-phosphate esters of every pharmacologically useful 21-hydroxysteroid, such as cortisone, hydrocortisone, prednisone, prednisolone, 9α-fluoroprednisone, 9α-fluoroprednisolone, dexamethasone, paramethasone, triamcinolone, 16β-methylprednisone, etc. Of course, the 21-phosphate esters are present in the parenteral solutions in the form of their soluble salts, such as an alkali metal salt or a salt with an aliphatic or araliphatic amine.

The aqueous parenteral solutions are generally prepared by dissolving in water the 21-phosphate ester salt, or suspending the 21-phosphate ester in water followed by the alkali metal hydroxide or carbonate or the amine to have a solution with a pH of about 6 to 8, and preferably 6.5 to 7.5, and then adding the stabilizing agent. The parenteral solution will then contain the usual antioxidant agents, such as alkali metal sulfites and citrates, sodium formaldehyde sulfoxylate, etc; if desired, the common preservatives, such as methyl and propyl 4-hydroxybenzoate, benzyl alcohol, chelating agents, such as ethylenediaminotetraacetic acid and derivatives, etc.; and buffering agents, such as mono- and di-sodium phosphate, sodium acetate, sodium citrate, and others. If desired, other therapeutically active ingredients can be added, provided they are compatible with the steroid phosphate and with the other ingredients of the composition.

In a preferred embodiment of the invention, the 21-hydroxysteroid 21-phosphate is present in a concentration of about 1 to about 500 mg. per ml. of solution, depending upon the physiological activity of the steroid used. The stabilizing agent is present in a concentration of about 0.10 to about 10 mg. per ml. of solution. The other ingredients, i.e., the antioxidant and the buffering agents are added in the concentrations which are commonly used in parenteral solutions.

The following examples illustrate the invention.

EXAMPLE 1

To prepare one thousand 2 ml. ampuls the following ingredients are used:

| | |
|---|---|
| Prednisolone 21-phosphate disodium salt | 70 g. |
| Sodium citrate anhydrous | 20 g. |
| Propylene glycol | 330 g. |
| Thioglycerol | 1 g. |

Citric acid q.s. to pH 7.0
Distilled waters q.s. to 2 liters

To a mixture of one liter of water and all of the propylene glycol the sodium citrate and prednisolone 21-phosphate are added, followed by thioglycerol acid and citric acid to pH 7.0. Water is then added to the volume of 2 liters, the mixture is aseptically filtered and filled into the ampuls.

EXAMPLE 2

The same preparation as in Example 1 is prepared, but substituting thioglycolic acid for thioclycerol in the same doses.

EXAMPLE 3

To prepare one-thousand 5 ml. ampuls the following ingredients are used:

| | |
|---|---|
| Hydrocortisone 21-phosphate disodium salt | 1,490 g. |
| Sodium citrate | 50 g. |
| Propylene glycol | 830 g. |
| Thioglycerol | 5 g. |

Citric acid q.s. to pH 7.0 4
Distilled water q.s. to 5 liters.

EXAMPLE 4

To prepare one-thousand 2 ml. ampuls the following ingredients are used:

| | |
|---|---|
| Dexamethasone 21-phosphate disodium salt | 137 g. |
| Sodium citrate | 20 g. |
| Propylene glycol | 330 g. |
| Thioglycerol | 0.5 g. |

Citric acid q.s. to pH 7.0
Distilled water q.s. to 2 liters

The preparation is repeated using respectively 1,2,5 and 10 g. of thioglycerol.

EXAMPLE 5

All preparations of Example 4 are repeated, but using 16β-methylprednisone 21-phosphate instead of dexamethasone 21-phosphate.

All the preparations according to Examples 1–5 above did not show any appreciables precipitate or cloudiness after storing for several months at room temperature, or for 30–45 days at 50°C.

For comparison, analogous preparations, but containing 20 mg. per ampul of cysteine as stabilizer were used. A marked crystalline precipitate was always observed after 6 days at room temperature and 3 days at 50°C.

In the absence of stabilizing agents the same solutions became cloudy after a few hours.

We claim:

1. A pharmaceutical composition suitable for parenteral administration, comprising an aqueous solution of a parenterally effective dosage amount of a 21-hydroxy-steroid 21-phosphate and sufficient thioglycerol to stabilize the solution against precipitation.

2. A stable aqueous solution suitable for parenteral administration, comprising an aqueous solution of a parenterally effective dosage amount of a 21-hydroxysteroid 21-phosphate and from about 0.10 to 10 mg. per ml. of thioglycerol.

3. A pharmaceutical composition according to claim 1, in which the 21-hydroxysteroid 21-phosphate is dexamethasone 21-phosphate.

4. A pharmaceutical composition according to claim 1, in which the 21-hydroxysteroid 21-phosphate is prednisolone 21-phosphate 5. A pharmaceutical composition according to claim 1, in which the 21-hydroxysteroid 21-phosphate is hydrocortisone 21-phosphate.

6. A pharmaceutical composition according to claim 1, in which the 21-hydroxysteroid 21-phosphate is 16β-methylprednisone 21-phosphate.

7. A pharmaceutical composition of claim 1 wherein the aqueous solution has a pH of 6.5 to 7.5.

8. A pharmaceutical composition of claim 1 wherein the 21-hydroxysteriod 21-phosphate is the sole essential therapeutically active ingredient.

9. A pharmaceutical composition of claim 1 consisting essentially of the aqueous solution of the 21-hydroxysteroid 21-phosphate, the thioglycerol stabilizer, and ingredients selected from the group consisting of antioxidant agents, preservatives, chelating agents, and buffering agents.

* * * * *